Patented Dec. 25, 1951

2,580,015

UNITED STATES PATENT OFFICE 2,580,015

DIESEL FUEL

Richard S. George, Wilmington, Del., assignor to Hercules Powder Company, Wilmington, Del., a corporation of Delaware No Drawing. Application December 31, 1947, Serial No. 795,137

5 Claims. (Cl. 44—57)

This invention relates to hydrocarbon diesel fuels and, more particularly, to such fuels containing a small amount of an $a,a$-dialkylarylmethyl hydroperoxide.

It is known that organic peroxides have the property when dissolved in hydrocarbon diesel fuels of acting as ignition accelerators of such fuels. In other words, the peroxides increase the cetane number of the fuels. However, the various peroxides which have been used previously for this purpose have had numerous disadvantages, in particular, their explosibility. Tetralin peroxide, ketone peroxides, and similar peroxides, for example, are all highly explosive and their handling is exceedingly dangerous unless they are highly diluted with some inert material. Likewise, diesel fuel knock depressors such as alkyl nitrates and dialkyl polysulfides are disadvantageous because they are either corrosive or produce corrosive products upon combustion. It has been desirable to find a stable peroxide material which will increase the cetane numbers of diesel fuels and which will not produce corrosion.

In accordance with this invention it has been found that a composition comprising a hydrocarbon diesel fuel and an $a,a$-dialkylarylmethyl hydroperoxide will act as an improved diesel fuel having an increased cetane value over the base fuel itself. The compositions of this invention may be safely prepared and handled and represent an inexpensive and efficient means for providing a fuel having an increased cetane number.

The following examples constitute specific embodiments of the invention. All parts in the examples are based on parts by weight.

EXAMPLE 1

The $a,a$-dialkylarylmethyl hydroperoxide used in this example was $a,a$-dimethylbenzyl hydroperoxide, obtained by the air oxidation of cumene in the liquid phase in the presence of aqueous sodium hydroxide. The reaction product from the oxidation was concentrated by removal of unreacted cumene to give a material containing 92% $a,a$-dimethylbenzyl hydroperoxide and having 9.7% active oxygen. To 100 parts, in each instance, of a hydrocarbon diesel fuel having a cetane number of 40.6 there were added varying amounts of the 92% hydroperoxide. The effect of the addition on the cetane number of the fuel is shown in Table I.

Table I

| Parts of Added Hydroperoxide | Cetane Number | Cetane Number Increase |
|---|---|---|
| 0.25 | 41.3 | 0.7 |
| 0.50 | 42.2 | 1.6 |
| 1.0 | 44.9 | 4.3 |
| 2.0 | 49.8 | 9.2 |

EXAMPLE 2

The $a,a$-dimethylbenzyl hydroperoxide used in this example was obtained by the air oxidation of cumene in the liquid phase in the presence of aqueous sodium hydroxide. The reaction product from the oxidation was stripped of unreacted cumene by steam distillation to give a material containing 61.8% $a,a$-dimethylbenzyl hydroperoxide and having 6.5% active oxygen. The effect of this material on the cetane number of a hydrocarbon diesel fuel base is given in Table II.

Table II

| Parts of Diesel Fuel Base | Parts of Added Hydroperoxide | Cetane Number | Cetane Number Increase |
|---|---|---|---|
| 100.0 | ---------- | 56.5 | ------ |
| 98.0 | 2.0 | 68.0 | 11.5 |
| 95.0 | 5.0 | 74.7 | 18.2 |

EXAMPLE 3

The hydroperoxide used in this example was $a,a$-ethylmethylbenzyl hydroperoxide, obtained by the oxidation with oxygen of sec-butylbenzene in the liquid phase in the presence of aqueous sodium hydroxide. The reaction product from the oxidation was concentrated by removal of unreacted cumene to give a material containing 72.0% $a,a$-ethylmethylbenzyl hydroperoxide. The effect of this material on the cetane number of a hydrocarbon diesel fuel base is given in Table III.

Table III

| Parts of Diesel Fuel Base | Parts of Added Hydroperoxide | Cetane Number | Cetane Number Increase |
|---|---|---|---|
| 100.0 | ---------- | 45.1 | ------ |
| 98.0 | 2.0 | 54.0 | 8.9 |
| 95.0 | 5.0 | 57.2 | 12.1 |

The compositions used in accordance with this invention have been shown by the examples as involving the use of the hydroperoxides obtained from the oxidation of cumene and sec-butylbenzene, but other α,α-dialkylarylmethyl hydroperoxides also are operable. Such hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° C. and about 120° C. in the presence of an aqueous alkali. The concentration of the aqueous alkali may be between about 1% and about 35% although it is preferable to use concentrations of about 2% to about 8%. Vigorous agitation is desirable during the oxidation reaction.

The α,α-dialkylarylmethyl hydroperoxides used in accordance with this invention have the following structural formula

in which $R_1$ and $R_2$ represent alkyl groups, Ar represents a substituent selected from the group consisting of aryl and alkaryl groups and X represents the hydroperoxy (—OOH) group. As illustrative of the alkyl-substituted aromatic organic compounds which may be oxidized, p-cymene, cumene, diisopropylbenzene and sec-butylbenzene may be mentioned. These compounds lead to α,α-dimethyl-p-methylbenzyl, α,α-dimethylbenzyl, α,α-dimethyl - p - isopropylbenzyl and α,α-ethylmethylbenzyl hydroperoxides, respectively. Also, in the case of diisopropylbenzene there may be obtained α,α,α',α'-tetramethyl-p-xylene dihydroperoxide. These compounds also may be named as aryl(dialkyl)methyl hydroperoxides; for example, α,α-dimethylbenzyl hydroperoxide may be designated as phenyl-(dimethyl)methyl hydroperoxide. The aryl and alkaryl groups need not be derived from benzene, as is the case in the afore-mentioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl, and the like, to give alkaryl substituents, the same alkyl groups also being representative of $R_1$ and $R_2$ in the structural formula. $R_1$ and $R_2$ may be either the same or different.

In carrying out this invention the compositions comprising an α,α-dialkylarylmethyl hydroperoxide and a hydrocarbon diesel fuel may be prepared using several modifications of the hydroperoxide material. The hydroperoxide may be used, for example, either in the form of the pure hydroperoxide, or in the form of a crude reaction mixture containing the hydroperoxide and obtained by the oxidation with air or oxygen of an alkyl-substituted aromatic organic compound having the structural formula shown previously. When the hydroperoxide is obtained by such an oxidation, the oxidation usually is interrupted before all of the hydrocarbon has reacted in order to avoid or limit side reactions. In this manner the α,α-dialkylarylmethyl hydroperoxide is obtained in mixture with smaller or larger amounts of the original hydrocarbon, which is an α,α-dialkylarylmethane, and the mixture also may contain secondary reaction products such as the corresponding alcohols, which are α,α-dialkylarylmethyl alcohols. The oxidation of cumene, for example, leads to a reaction product containing α,α-dimethylbenzyl hydroperoxide, α,α-dimethylbenzyl alcohol, a small amount of acetophenone, and unchanged cumene. Such a reaction product may be used per se in forming the hydrocarbon diesel fuel-hydroperoxide compositions of this invention. In case it is desirable, however, to obtain the hydroperoxide in a more concentrated form, the hydroperoxide may be separated from the other constituents of the crude reaction mixture. The hydroperoxides may be separated from the reaction mixtures by, for example, fractional distillation at very low pressures, of the order of 0.01 to 1.0 mm./sq. cm., the hydroperoxides having higher boiling points than the related hydrocarbon, alcohol and ketone. In some instances the hydroperoxides also may be separated from the oxidation reaction mixtures by crystallization, which may be facilitated by first distilling off at least part of the hydrocarbon. Steam distillation usually is sufficient to remove the hydrocarbon.

The compositions of this invention may be prepared by addition of an α,α-dialkylarylmethyl hydroperoxide to various hydrocarbon diesel fuels such as gas oil, solar oil, Edeleanu kerosene extract, heavy pressure distillate, coal tar fractions, and the like. The concentration of the α,α-dialkylarylmethyl hydroperoxide in the composition comprising the hydroperoxide and the hydrocarbon diesel fuel may be varied from about 0.25 to about 5.0% by weight based on the total composition. A preferable amount of hydroperoxide on this basis is from about 1.0 to about 2.0% by weight.

If desired, the diesel fuels may contain additional additives such as antioxidants, for example, various alkyl phenols such as the xylenols, trimethyl phenol, 2,4-dimethyl-6-tertbutylphenol, and the like; aromatic amines, preferably secondary aromatic amines, such as N,N'-dibutyl phenylene diamine, diphenylamine, phenyl-α-naphthylamine, and the like; aminophenols, such as benzyl-p-aminophenol; anticorrosive agents such as dicarboxylic acids having at least 16 carbon atoms, for example, the alkyl succinic acids; pour point reducers, viscosity or viscosity index improvers, and wear reducers such as the carbamic acid esters. Moreover, diesel knock depressors such as alkyl nitrates or nitrites and the dialkyl tetrasulfides may be used in conjunction with the hydroperoxides of this invention.

Through use of the compositions in accordance with this invention there are provided improved diesel fuels of increased cetane numbers. Furthermore, the fuels may be more safely produced due to the stability of the α,α-dialkylarylmethyl hydroperoxides, and the resulting compositions also may be safely handled. Through use of the α,α-dialkylarylmethyl hydroperoxides of this invention there are provided cheap and effective means of raising the cetane numbers of hydrocarbon diesel fuels.

What I claim and desire to protect by Letters Patent is:

1. A liquid fuel composition for compression ignition engines comprising a predominant amount of hydrocarbon diesel fuel, and from about 0.25 to about 5.0% by weight, based on the total composition, of an α,α-dialkylarylmethyl hydroperoxide.

2. A liquid fuel composition for compression ignition engines comprising a predominant amount of a hydrocarbon diesel fuel, and from about 1.0 to about 2.0% by weight, based on the total composition, of an α,α-dialkylarylmethyl hydroperoxide.

3. A liquid fuel composition for compression ignition engines comprising a predominant amount of a hydrocarbon diesel fuel, and from about 0.25 to about 5.0% by weight, based on the total composition, of α,α-dimethylbenzyl hydroperoxide.

4. A liquid fuel composition for compression ignition engines comprising a predominant amount of a hydrocarbon diesel fuel, and from about 0.25 to about 5.0% by weight, based on the total composition, of α,α-dimethyl-p-methylbenzyl hydroperoxide.

5. A liquid fuel composition for compression ignition engines comprising a predominant amount of a hydrocarbon diesel fuel, and from about 0.25 to about 5.0% by weight, based on the total composition, of α,α-dimethyl-p-isopropylbenzyl hydroperoxide.

RICHARD S. GEORGE.

REFERENCES CITED

The following references are of record in the file of this patent:

UNITED STATES PATENTS

| Number | Name | Date |
| --- | --- | --- |
| 2,093,008 | Egerton | Sept. 14, 1937 |
| 2,403,771 | Vaughan et al. | July 9, 1946 |
| 2,403,772 | Vaughan et al. | July 9, 1946 |
| 2,470,276 | Watkins | May 17, 1949 |